United States Patent Office 3,408,331
Patented Oct. 29, 1968

3,408,331
HIGH NITROGEN CONTAINING MONOMERIC
1,2 - ETHYLENE BIS(AMINOGUANIDINE)
COMPOUND - ALDEHYDE CONDENSATION
POLYMER
Earl Thomas Niles, Midland, Mich., and Phyllis D. Oja, San Francisco, and Calvin E. Pannell, Walnut Creek, Calif., assignors to The Dow Chemical Company, Midland, Mich., a corporation of Delaware
No Drawing. Filed Sept. 9, 1965, Ser. No. 486,601
10 Claims. (Cl. 260—72)

ABSTRACT OF THE DISCLOSURE

High nitrogen containing monomeric 1,2-ethylene bis (amino guanidine) compound-aldehyde condensation polymers. Said polymers are useful as solid propellant binders, gas generators in ammunition and chemical intermediates.

---

This invention is concerned with polymers having a high nitrogen content and more particularly is concerned with organic nitrogen containing polymers having a nitrogen: carbon atomic ratio greater than 1 and which also have properties which make them particularly suitable for use as binders in solid propellant grains.

The overall effectiveness of the nitrogen polymeric oxidizing source materials commonly used in rocket propellant systems is reduced by the large amount of carbon present in the molecules. This latter element, as is well understood in the rocket propellant art, does not contribute to the desired combustion process and reduces the overall effectiveness of the nitrogen oxidizing source material. Conventional high nitrogen source materials, as presently known to the art, include poly(ethylenehydrazine) and poly(2-methyl-5-vinyltetrazole) both of which have an atomic N:C ratio of 1.

It is recognized in the propellant art that desirably a high nitrogen oxidizing material for use in those systems employing a nitrogen oxidizer, e.g., the "B-N" system, should have a nitrogen:carbon ratio greater than 1 to insure good performance. To illustrate, with a nitridable fuel, e.g., a boron based material, and an oxidizing nitrogen source material, increasing the N:C ratio of the nitrogen oxidizer from 1 to 2 will increase the specific impulse of the system about 10 seconds.

This desirable high N/C ratio is provided by the new and novel compounds of the present invention comprising a polymeric composition having repetitive units of a monomeric 1,2-ethylenebis(amino guanidine) compound condensed with an aldehyde wherein the N:C atom ratio of the polymer product is 1.5 or more.

Along with the desirable high N/C ratio set forth hereinbefore, these novel polymers also possess other characteristics unattainable heretofore in high nitrogen containing organics which makes these present compounds especially suitable for use as binders in solid propellant formulations. A number of these properties are summarized directly hereinafter.

They exhibit a marked resistance to thermal degradation at moderately elevated temperatures.

They readily can be plasticized into rubbery-type solids with a wide variety of plasticizing agents. Conveniently, the monomer reactants can be dissolved in a liquid plasticizer whereupon they undergo polymerization into a hard rubbery mass. An added advantage is that the solid polymers can be loaded with solid fuel and oxidizer components employed in propellants without any adverse effect on the properties of the elastomeric solid. The polymers are compatible with a number of common rocket propellant ingredients.

The present novel polymers are markedly resistant to degradation when exposed to normal atmospheres and have a high insensitivity to shock. Because of these traits, the compounds can be safely prepared, stored and handled.

Additionally, the novel materials have a high positive heat of formation.

Particularly suitable 1,2-ethylenebis(aminoguanidine) monomer reactants to be employed include, for example, the monomers corresponding to the structural formula

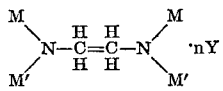

where M is either hydrogen (—H) or amino (—NH$_2$) and M' is

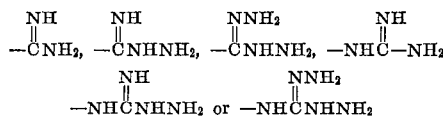

being further characterized in that when M is hydrogen, M' is

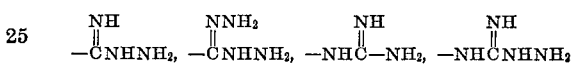

or

and when M is amino M' is

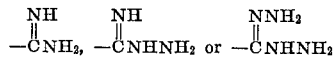

Y is a mono-, di- or tribasic acid and $n$ is an integer ranging from 1 to 4. Ordinarily Y is a hydrochloric (HCl), hydrobromic (HBr), hydroiodic (HI), nitric (HNO$_3$), perchloric (HClO$_4$), chloric (HClO$_3$), sulfuric (H$_2$SO$_4$), hydrazoic (HN$_3$), phosphoric (H$_3$PO$_4$), carbonic (H$_2$CO$_3$) and the like acids which usually are used to prepare the mono- or di-acid salts; i.e., where $n$ is either 1 or 2. Alternatively, the monomers can be employed as the corresponding free base. Preferably to assure the optimum in product purity and yield, the monomer reactant is purified, as by crystallization, before use.

These 1,2-ethylenebis(aminoguanidine) compounds can be prepared by reacting an S-alkylisothiouronium salt compound with a 1,2-ethylenediamine or 1,2-ethylenedihydrazine. In practice, usually a solution or slurry of the alkylisothiouronium reactant is agitated and to this mixture slowly is added, usually at room temperature, a water or an aliphatic alcohol solution of the -diamine or -hydrazine reactant in an amount to provide a mole ratio of S-alkylisothiouronium reactant/ethylenediamine or ethylenehydrazine of from about 0.8 to about 1.2. Following completion of reactant mixing, the resulting product mixture ordinarily is allowed to stand for an extended period of time, i.e., several hours or more, usually with stirring or agitation. Crystalline monomer product is recovered from the product solution usually by fractional precipitation. The compounds readily are purified by recrystallization from water or water-alcohol solutions.

Aldehydes which are employed are formaldehyde, glyoxal, paraformaldehyde and mixtures of these materials. Also, reactive derivatives, for example, the acetal, oxime, etc. of the aldehyde compound can be used.

Generally, commerically available formaldehyde and glyoxal solutions are acidic as obtained. If these are used directly in the polymerization reaction particularly for the preparation of azides and other weak acid salts, the resulting polymers may have less desirable properties and/or a N:C ratio reduced from that calculated for the theoretical. However, unexpectedly it has been found that if the pH of these commercial aldehyde solutions is adjusted, e.g. with ammonia solution, to be from about pH 7 to about pH 9 and preferably from about pH 7 to about 7.5 prior to use in the polymerization process the resulting polymer has a N:C ratio substantially the same as calculated as well as properties particularly suitable for use as propellant binders.

The mole ratio of reactants, i.e. aldehyde to nitrogen monomer to be used in the repetitive units of the polymer is limited only in the respect that the desired N:C atom ratio is maintained in the polymer product. Ordinarily this ratio will range from about 0.5 to 3 (aldehyde:amine) and preferably is about 1.

The preparation of the polymer is carried out directly with the reactant members or in a polar or nonpolar liquid carrier or solvent, or mixture of carriers or solvents. Particularly suitable solvents or carriers include, for example, water, methylene chloride, benzene, dimethylformamide, methanol, toluene, mineral spirits, chloroform, ethanol, propanol, ethers, carbon tetrachloride, formamide, dioxane and the like as well as mixtures thereof. Preferably, water, methanol or formamide is employed as a liquid vehicle in the preparation of the instant polymers.

The reaction is carried out over a temperature range wherein the particular solvent or carrier, if such is employed, is in the liquid state and below which detrimental product or reactant decomposition occurs. Ordinarily temperatures of from about room temperature to about 100° C. are used. Preferably a reaction temperature of from about 60 to about 80° C. is employed.

The reaction can be carried out in low pressure equipment at reduced pressures, i.e. 0.01 millimeter or less mercury absolute or at superatmospheric pressures in appropriate high pressure reactors. However, conveniently the reaction is carried out in ordinary equipment at atmospheric pressures.

The time of reaction is not critical but ordinarily will be that needed to obtain substantially complete reaction of the reactants into the polymer at the reaction temperatures and pressures employed. For most products, a reaction time of from about 1 minute to about 4 hours or more is employed; usually the reaction is run over a period of from about 5 to about 30 minutes when carried out at atmospheric pressure and at the preferred operating temperature of from 60 to about 80° C.

Since the present polymers are compatible with oxidizer and fuel ingredients used in conventional solid propellants, for example, ammonium perchlorate and aluminum, these novel high nitrogen materials are highly suitable for use as binders in solid propellant systems. In addition to being compatible with conventional propellant ingredients, when used as binders with these materials, the high nitrogen polymers serve to increase the thrust (specific impulse) of the system and to promote the formation of desirable low molecular weight exhaust gases. Additionally, they can be used as binders for fuel components in hybrid systems or as binders for oxidizers in reverse hybrid systems.

These new and novel polymers have a general utility as gas generators, projectile propellants for use in ammunition as well as serve as chemical intermediates.

The following examples will serve to illustrate further the present invention but are not meant to limit it thereto.

Example 1

1,2-ethylenediamine (98%) was added at room temperature to an aqueous slurry of S-methylisothiosemicarbazonium hydrobromide (mole ratio of S-methylthiosemicarbazonium hydrobromide/ethylenediamine of about 2). The resulting mixture was allowed to stand for about 16 hours during which time colorless crystals formed in the reaction flask. These were collected, washed with methanol and dried. The resulting product had a melting point of 248–250° C. Elemental analysis, infrared spectrum and nuclear magnetic resonance spectrum all substantiated that the resulting product was N,N'-bis(aminoguanyl)-1,2-ethylenediamine dihydrobromide corresponding to the formula

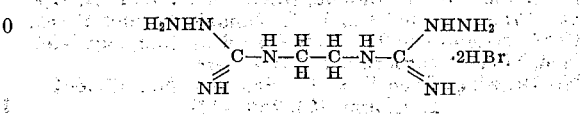

This product was converted to the free base by contact with a basic (OH⁻) ion exchange resin and the dihydrazoic acid salt formed by neutralization of the free base with hydrazoic acid.

About 130 grams (~0.5 gram mole) of the N,N'-bis(aminoguanyl)-1,2-ethylenediamine·2HN₃, 40.5 milliliters of 36.7% aqueous formaldehyde solution (containing about 0.5 gram mole of formaldehyde) and 10 milliliters of water were added to a reaction vessel. The resulting mixture was stirred for about 0.5 hour at ambient temperature, i.e. about 20° C. The reaction vessel was placed in an oil bath at 75° C. and heated for about 20 minutes. The resulting viscous product mixture was cooled at ambient conditions over a 2 hour period during which time a tough, gum-rubber like mass formed. This product was found to contain about 22 percent water. The rubbery product was cut up and dried at about 39° C., substantially in vacuo. After this procedure, the product was pulverized in a Waring blender and redried under the same conditions for a total drying time of about 24 hours. The final product was a light tan-colored, powdered resin.

Elemental analysis found for the product was C, 22.2%; H, 6.0%; N, 71.8%. Theoretical calculated analysis of the 1:1 condensation polymer of N,N'-bis(aminoguanyl)-1,2-ethylenediamine dihydrazoic acid salt with formaldehyde having a formula with repetition units corresponding to the following

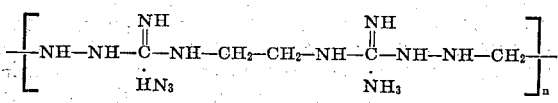

where $n$ is at least 2, shows C, 22.05%; H, 5.92%; N, 72.01%.

The infrared spectrum showed absorption peaks at 4.7, 4.9, 6.0 and 6.1 microns. These data and those from nuclear magnetic resonance studies supported the assigned structure.

The polymer had an N:C ratio of 2.8. Its density was 1.4 grams per cubic centimeter. It softened at 94° C. and melted at 128–130° C. with decomposition. The measured heat of formation was +47.9±3 Kcal./100 grams.

Solubility measurements with representative solvent materials showed the polymer was soluble in water, dimethylsulfoxide, ethylene glycol, formic acid and formamide but was substantially insoluble in dimethylformamide and ethanol.

In a standard impact sensitivity test, there was no indication of fire at 120 cm./2 kg.

Differential thermal analysis showed an exothermic peak at 121.5° C.

Thermogravimetric analysis indicated a weight loss starting at 130° C.

The relative viscosity of a 1 percent solution in water and in dimethyl sulfoxide was about 1.06 at 30° C.

The tensile properties of the polymer when plasticized with various pasticizers at a number of weight percent loadings were evaluated. The results of this study are summarized in Table I.

TABLE I

| Run No. | Plasticizer | | Tensile Yield, p.s.i. | Elongation, Percent |
|---|---|---|---|---|
| | Type | Percent | | |
| 1 | Water | 5 | 330 | 101 |
| 2 | do | 10 | 210 | 62 |
| 3 | do | 15 | 150 | 54 |
| 4 | Ethylene glycol | 5 | 350 | 28 |
| 5 | do | 10 | 150 | 22 |
| 6 | do | 15 | 60 | 23 |
| 7 | Glycerine | 5 | 225 | 28 |
| 8 | do | 10 | 110 | 18 |
| 9 | N-(2-hydroxyethyl) formamide | 5 | 187 | 13 |
| 10 | do | 10 | 60 | 24 |

These properties indicate the suitability of the present novel composition for use as an elastomeric binder in propellants.

Additionally, qualitative studies showed a wide variety of other ordinary and high energy plasticizers employed in the propellant art can be used with the present novel compound. These include, for example, 2-triazoethanol, methylnitramine, 1,4-bis(triazo)-2,3-butanediol, ethylenecyanohydrin, glyceryl carbonate, methanol, formamide and dimethylsulfoxide. Secondary plasticizers such as trimethylolethane trinitrate and petrin when used in admixture with a primary plasticizer, e.g., ethylene glycol, also can be used with the present novel polymer product.

A hybrid propellant grain composed of the present polymer plasticized with about 10 percent water was fired in a small hybrid motor using gaseous oxygen as an oxidizer. The binder composition grain burned smoothly to completion with the generation of large volumes of gaseous exhaust products.

Compatability studies between the present polymer composition and a wide variety of propellant ingredients were carried out at 25° C. Compatability, as evidenced by no reaction, was shown for the polymer with aluminum hydride, nitrocellulose, coated nitronium perchlorate, ammonium perchlorate, triethyleneglycol dinitrate, diethyleneglycol dinitrate, trimethylolethane trinitrate, pentaerythritol trinitrate, perfluorobiguanide and nitroglycerine.

Synthetic solid propellant grains were prepared by "loading" the binder with 70 weight percent of 100–200 micron feldspar particles (simulating oxidizer and fuel components of a grain). Tensile properties were measured at intervals over a total time period of about 120 hours. No detrimental degradation of tensile properties was observed for the so-loaded polymer.

A number of runs were made evaluating process variables in the production of this polymer.

Using reaction media of various pH levels showed that a substantially constant rapid rate of reaction occurred over a pH range of 3.5 to about 7; this rate fell off rapidly above about pH 9.

Satisfactory product formation was realized after about 30 minutes at room temperature, and at 15 minutes or less at about 70° C.

The same product of properties set forth hereinbefore was obtained also by reaction of this diazide salt with methanolic formaldehyde, and alkaline methanolic paraformaldehyde.

Example 2

The general procedure and technique described in Example 1 was used for reacting 10.08 grams of N,N'-bis(aminoguanyl)-1,2-ethylenediamine dihydrobromide (0.03 gram mole), 2.43 milliliters of 36.7% aqueous formaldehyde solution (0.03 gram mole formaldehyde) which had been adjusted to a pH of 7.5 with ammonium hydroxide and 1 milliliter of water. The mixture was stirred for 0.5 hour at room temperature and the reaction vessel then placed in a 70° C. oil bath for about 15 minutes. The reaction mass gradually thickened to a rubber consistency during this period. The resulting product mass was cut up, removed from the vessel and dried substantially in vacuo at 39° C. for about 72 hours. The resulting dried product was a yellow-colored, hard resin, melting at about 185–200° C., with decomposition.

Elemental chemical analysis gave C, 17.21%; H, 4.51%; N, 31.82%; Br, 46.2%. Theoretical calculated analysis of the 1:1 condensation polymer of N,N'-bis(aminoguanyl)-1,2-ethylenediamine dihydrobromide with formaldehyde is C, 17.18%; H, 5.17%; N, 32.00%; Br, 46.20%.

This product had a N:C ratio of 1.6. It is soluble in water, 5% hydrochloric acid and dimethylformamide but is insoluble in ethanol.

Example 3

About 2.45 grams (0.005 gram mole) of N,N'-bis(diaminoguanidino)-1,2-ethylenediamine dihydroiodide, 20 milliliters of water and 0.4 milliliter of 36.7% aqueous formaldehyde solution (0.005 gram mole formaldehyde) were mixed and heated in a 70° C. oil bath for about 1 hour. The resulting rubber-like mass which formed upon cooling was transformed by drying substantially in vacuo into a hard orange resin.

Elemental chemical analysis showed C, 11.4%; H, 4.3%; N, 33.9%; I, 49.9%. Theoretical analysis for the 1:1 condensation polymer of N,N'-bis(diaminoguanidino)-1,2-ethylenediamine dihydroiodide with formaldehyde is C, 9.79%; H, 4.08%; I, 51.86%.

The properties of this polymeric resin were generally the same as shown for the other polymeric members described herein.

Example 4

Other 1:1 polymers were prepared by reacting aqueous formaldehyde solutions with N,N'-diamino-N,N'-bis(diaminoguanidino)-1,2-ethylenediamine hydrobromide, N,N'-bis(diaminoguanidino)-1,2-ethylenediamine dihydrazoic acid salt, N,N'-diamino-N,N'-bis(aminoguanyl)-1,2-ethylenediamine dihydrobromide and N,N'-bis(aminoguanyl)-1,2-ethylenediamine dinitric acid salt in accordance with the procedure and mole quantities set forth in Example 1. In all cases a hard, resin ranging from tan to yellow-orange to yellow in color was obtained. These polymers exhibited the same general properties as shown by the resins described hereinbefore.

In a manner similar to that described for the foregoing examples, 1:1 polymers resulting from the condensation of aldehyde materials and the other monomeric 1,2-ethylenebis(aminoguanidine) compounds set forth hereinbefore readily can be prepared.

Various modifications can be made in the present invention without departing from the spirit or scope thereof for it is understood that we limit ourselves only as defined in the appended claims.

We claim:

1. A nitrogen containing organic polymer having a nitrogen:carbon atom ratio greater than 1 which comprises repetitive units of from about 1 molar equivalent of a 1,2-ethylenebis(aminoguanidine) compound corresponding to the structural formula $$\begin{array}{c} M \\ \phantom{M} \diagdown \\ \phantom{MM} N-\underset{\underset{H}{|}}{\overset{\overset{H}{|}}{C}}-\underset{\underset{H}{|}}{\overset{\overset{H}{|}}{C}}-N \\ \phantom{M} \diagup \\ M' \end{array} \quad \begin{array}{c} M \\ \diagdown \\ \phantom{MM} \cdot nY \\ \diagup \\ M' \end{array}$$

where M is either hydrogen (—H) or amino (—NH$_2$) and M' is $$-\overset{\overset{NH}{\|}}{C}NH_2, \quad -\overset{\overset{NH}{\|}}{C}NHNH_2, \quad -\overset{\overset{NNH_2}{\|}}{C}NHNH_2, \quad -NH\overset{\overset{NH}{\|}}{\underset{\underset{NH_2}{|}}{C}}$$

$$-NH\overset{\overset{NH}{\|}}{C}NHNH_2 \quad \text{or} \quad -NH\overset{\overset{NNH_2}{\|}}{C}NHNH_2$$

being further characterized in that when M is hydrogen, M' is

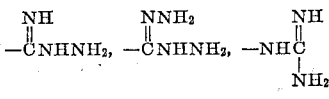

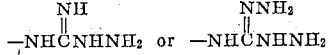

and when M is amino, M' is

Y is a mono-, di- or tribasic acid and $n$ is an integer ranging from 1 to 4, condensed with from about 0.5 to about 3 molar equivalents of
an aldehyde based compound selected from the group consisting of formaldehyde, glyoxal, paraformaldehyde, formaldehyde-glyoxal mixtures, acetals of formaldehyde, glyoxal, paraformaldehyde and formaldehyde-glyoxal mixtures and oximes of formaldehyde, glyoxal, paraformaldehyde and formaldehyde-glyoxal mixtures.

2. A nitrogen containing organic polymer having a nitrogen:carbon atom ratio greater than 1 which comprises the condensation product of a mole equivalent of N,N'-bis(aminoguanyl)-1,2-ethylenediamine dihydrazoic acid salt with a mole equivalent of formaldehyde.

3. A nitrogen containing organic polymer having a nitrogen:carbon atom ratio greater than 1 which comprises the condensation product of a mole equivalent of N,N'-bis(aminoguanyl)-1,2-ethylenediamine dihydrobromide with a mole equivalent of formaldehyde.

4. A nitrogen containing organic polymer having a nitrogen:carbon atom ratio greater than 1 which comprises the condensation product of a mole equivalent of N,N' - bis(diaminoguanidino) - 1,2 - ethylenediamine dihydroiodide with a mole equivalent of formaldehyde.

5. A nitrogen containing organic polymer having a nitrogen:carbon atom ratio greater than 1 which comprises the condensation product of N,N'-diamino-N,N'-bis(diaminoguanidino) - 1,2 - ethylenediamine hydrobromide with a mole equivalent of formaldehyde.

6. A nitrogen containing organic polymer having a nitrogen:carbon atom ratio greater than 1 which comprises prises the condensation product of N,N'-bis(diaminoguanidino)-1,2-ethylenediamine dihydrazoic acid salt with a mole equivalent of formaldehyde.

7. A nitrogen containing organic polymer having a nitrogen:carbon atom ratio greater than 1 which comprises the condensation product of N,N'-diamino-N,N'-bis(aminoguanyl)-1,2-ethylenediamine dihydrobromide with a mole equivalent of formaldehyde.

8. A nitrogen containing organic polymer having a nitrogen:carbon atom ratio greater than 1 which comprises the condensation product of N,N'-bis(aminoguanyl)-1,2-ethylenediamine dinitric acid salt with a mole equivalent of formaldehyde.

9. A process for preparing nitrogen containing organic polymers having a nitrogen:carbon atom ratio of greater than 1 which comprises:

(a) contacting about 1 molar equivalent of a 1,2-ethylenebis(aminoguanidine) compound corresponding to the structural formula

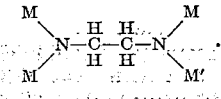

where M is either hydrogen (—H) or amino (—NH$_2$) and M' is

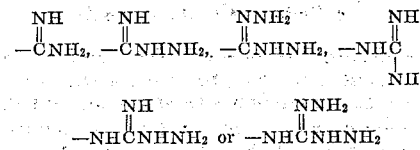

being further characterized in that when M is hydrogen, M' is

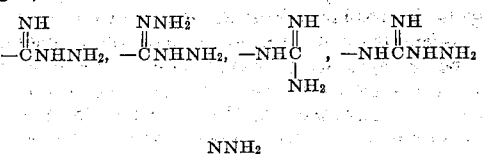

or

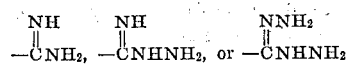

and when M is amino M' is $$-\overset{NH}{\underset{\|}{C}}NH_2, \quad -\overset{NH}{\underset{\|}{C}}NHNH_2, \text{ or } -\overset{NNH_2}{\underset{\|}{C}}NHNH_2$$

Y is a mono-, di- or tribasic acid and $n$ is an integer ranging from 1 to 4, with from about 0.5 to about 3 molar equivalents of an
aldehyde based compound selected from the group consisting of formaldehyde, glyoxal, paraformaldehyde, formaldehyde-glyoxal mixtures, acetals of formaldehyde, glyoxal, paraformaldehyde and formaldehyde-glyoxal mixtures and oximes of formaldehydes, glyoxal, paraformaldehyde and formaldehyde-glyoxal mixtures, and (b) reacting the mixture up to about 4 hours at a temperature where the solvent member is in its liquid form thereby to condense the 1,2-bis(ethylenediamine) compound and the aldehyde based material into the corresponding polymer having a nitrogen:carbon ratio greater than 1.

10. The process is defined in claim 9 wherein the aldehyde as employed is at a pH of from about 7 to about 7.5.

References Cited

UNITED STATES PATENTS 2,834,756   5/1958   Suen et al. _____ 260—72

WILLIAM H. SHORT, *Primary Examiner.*

BENJAMIN R. PADGETT, L. DEWAYNE RUTLEDGE, C. D. QUARFORTH, *Examiners.*

L. A. SEBASTIAN, *Assistant Examiner.*